J. E. TYLER.
Improvement in Straw-Cutters.

No. 130,883. Patented Aug. 27, 1872.

Witnesses:
A. Bennerkendorf.
C. Sedgwick.

Inventor:
Jno. E. Tyler
Attorneys.

UNITED STATES PATENT OFFICE.

JOHN E. TYLER, OF ROXOBEL, NORTH CAROLINA.

IMPROVEMENT IN STRAW-CUTTERS.

Specification forming part of Letters Patent No. 130,883, dated August 27, 1872.

Specification describing a new and Improved Straw-Cutter, invented by JOHN E. TYLER, of Roxobel, in the county of Bertie and State of North Carolina.

My invention consists of a straw-cutter in which the feeding of the straw is effected partly by gravitation and partly by the cutters, which are made to revolve under a hopper with an opening in the bottom, and some of them are provided with hooks on the points or ends for catching the straw and drawing it down to the place for cutting it into short pieces. My invention also consists of a pair of curved slotted plates, combined with the hopper and the cutters for conducting the straw to the place for cutting it; and it also consists of a slotted plate, combined with these guiding-plates and the cutters, for cutting the straw, all as hereinafter described.

Figure 1:
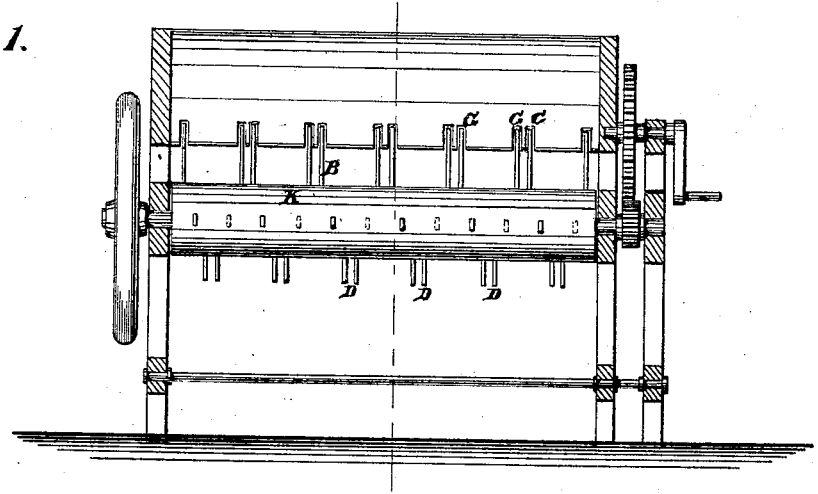
Figure 2:
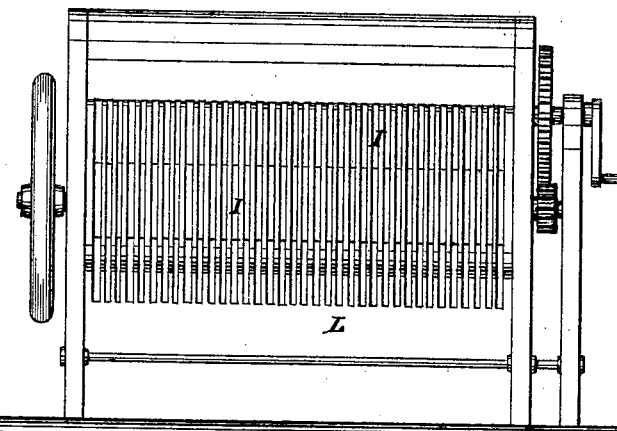
Figure 5:
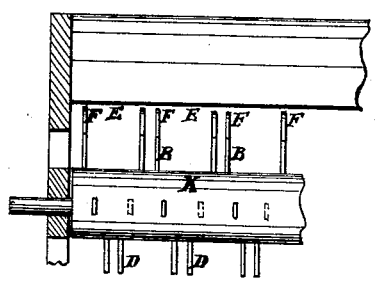
Figure 3:
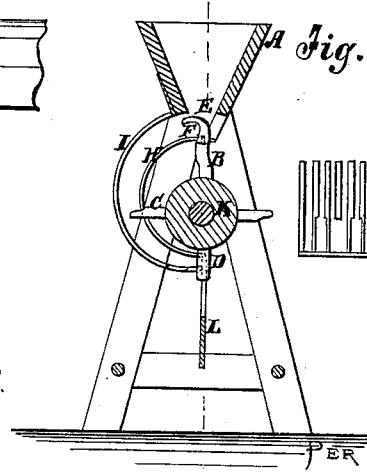
Figure 4:
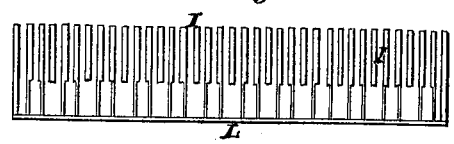

In the accompanying drawing, Figure 1 is a vertical sectional elevation of my improved straw-cutting machine taken on the line $x\ x$ of Fig. 3. Fig. 2 is a side elevation. Fig. 3 is a transverse sectional elevation taken on the line $y\ y$ of Fig. 1. Fig. 4 is a plan view of one of the guide-plates and the cutting-plate as they appear looking upward from under the machine, and Fig. 5 is a partial sectional elevation on the line $x\ x$ of Fig. 3 looking in the opposite direction to that in which Fig. 1 is seen.

Similar letters of reference indicate corresponding parts.

A is a long hopper at the top of the machine for receiving the straw to be cut and delivering it to the rotary cutters B, C, D, &c., through an opening, E, in the bottom at one side. The cutters B are longer than the others and have hooks, F, which hooks pass through short vertical slots G, extending up in one of the hopper sides some distance above the bottom for gathering the straw, carrying it through opening E downward between the curved slotted plates H and I to the under side of the cutter-cylinder K, where the end plates H and I curve toward the cylinder, so that the short cutters extend beyond the outermost one, and they terminate at a vertical slotted plate, L, against which the straw, delivered by the hooked cutters from the hopper with the space between the two curved plates, and cut into short lengths, is finally chopped into short pieces by the short cutters C, D, &c., between the cutters B, and then falls through the slots to the floor below, or to any suitable receptacle.

It will be seen that by this arrangement of apparatus I am enabled to dispense with the feeding-rollers and apparatus for actuating them common to other straw-cutters.

Having thus described my invention, I claim as new and desire to secure by Letters Patent—

1. The combination of the rotary hook-pointed cutters B F and slotted plates H, I, and L with a hopper, A, having an opening, E, at the bottom of one side, and the vertical slots G at the bottom of the other side, substantially as specified.

2. The combination, with said hopper and hooked cutters B F, of the cutters C D and slotted plates H, I, and L, substantially as specified.

JOHN E. TYLER.

Witnesses:
   T. B. MOSHER,
   ALEX. F. ROBERTS.